Patented Sept. 6, 1927.

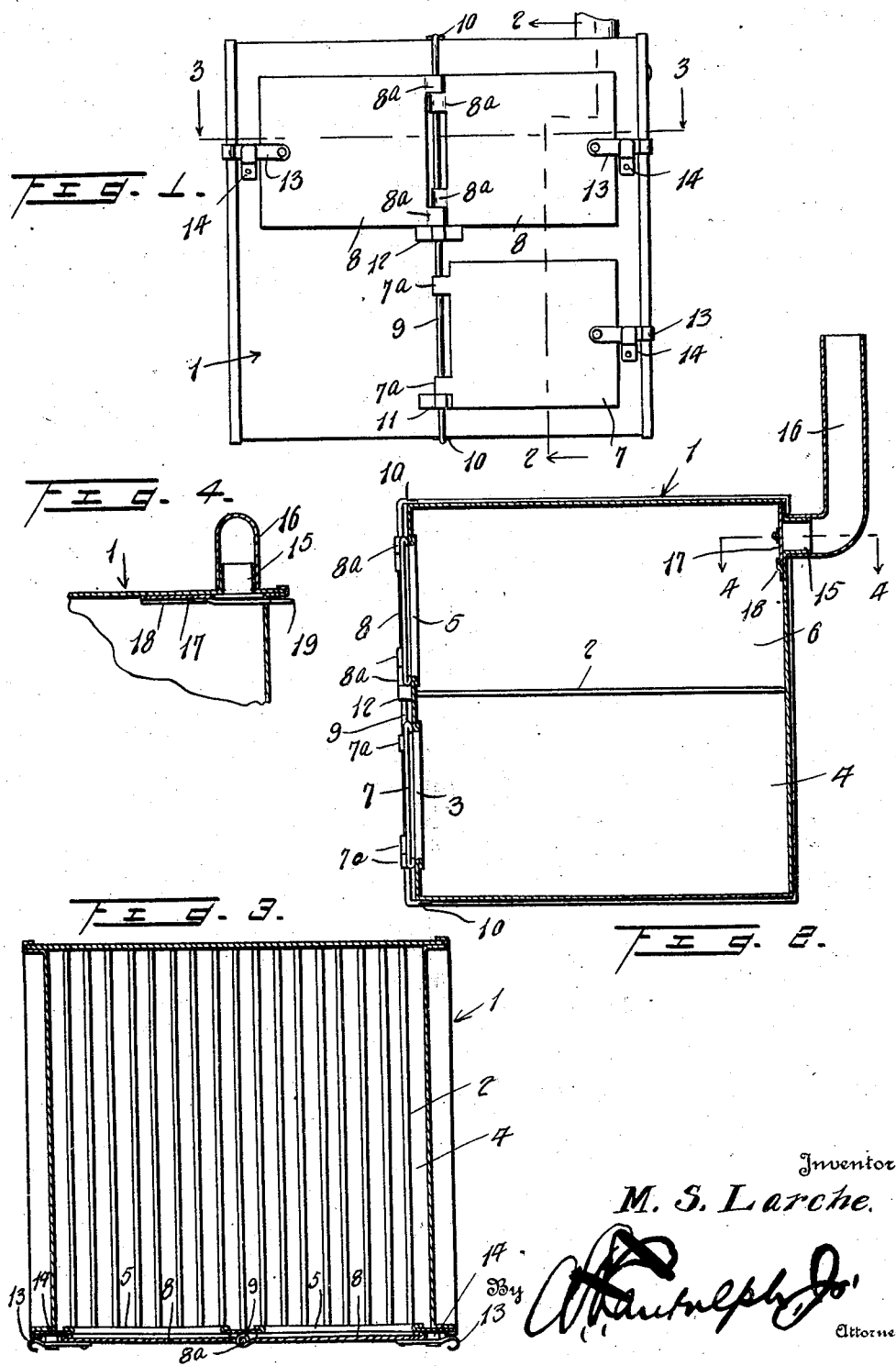

1,641,818

UNITED STATES PATENT OFFICE.

MARVIN S. LARCHE, OF BOWIE, TEXAS.

BARBECUE OVEN.

Application filed March 3, 1927. Serial No. 172,369.

This invention relates to ovens, and has for one of its objects to provide a novel, simple and inexpensive device of this character which shall be especially adapted for use at barbecues and in which the meat may be cooked in a manner to give it the required flavor and to obviate the necessity of basting.

With the foregoing and other objects in view, the nature of which will appear as the description proceeds, the invention consists of the construction, combination and arrangement of parts hereinafter fully described and claimed, and illustrated in the accompanying drawing, wherein:

Figure 1 is a view in front elevation of the barbecue oven,

Figure 2 is a sectional view taken on the vertical planes indicated by the line 2—2 of Figure 1, Figure 3 is a sectional view taken on the horizontal plane indicated by the line 3—3 of Figure 1, and Figure 4 is a detail sectional view taken on the horizontal plane indicated by the line 4—4 of Figure 2.

The barbecue oven comprises a casing 1 which is of rectangular contour in vertical and horizontal section and is provided centrally between the top and bottom sides thereof with a grid 2. The grid 2 extends from the front to the rear side of the casing 1 and from one lateral side thereof to the other, and consists of rods secured at their ends to the front and rear sides. That portion of the casing 1 located below the grid 2 constitutes a fire compartment and that portion above the grid constitutes a cooking compartment. The front side of the casing 1 is provided with an opening 3 to permit of access to the fire compartment 4 and with openings 5 to permit of access to the cooking compartment 6. A door 7 for the opening 3 and doors 8 for the openings 5 are connected to a single pintle rod 9 which is located outwardly beyond and at the vertical center of the front side of the casing 1. The pintle rod 9 is provided at its upper and lower ends with rearwardly directed arms 10 through the medium of which it is secured to the top and bottom sides of the casing 1 by means of rivets, bolts or the like. The door 7 is connected to the pintle rod 9 by knuckles 7ª, and is supported in proper position upon the pintle rod by a bracket 11. The bracket 11 is secured to the front side of the casing 1, and is provided with an aperture through which the pintle rod 9 passes. The doors 8 are secured to the pintle rod 9 by knuckles 8ª, and one of the doors is supported in proper position upon the pintle rod by a bracket 12, the door supported by the bracket 12 supporting the other door in proper position on the pintle rod. The bracket 12 is secured to the front side of the casing 1 and is provided with an aperture through which the pintle rod 9 passes. The doors 7 and 8 are of the solid or imperforate type, and are secured in closed position by catches 13 pivoted thereto and retractably engaged with keepers 14 secured to the front side of the casing 1. The rear side of the casing 1 is provided with a smoke outlet through which passes a thimble 15, a pipe 16 being removably secured to the thimble. The smoke outlet is located above the grid 2, and provided therefor is a damper 17 which is slidably mounted in horizontally disposed guides 18 secured to the rear side of the casing 1. A rod 19 secured to the damper 17 and passing through one of the lateral sides of the casing 1, provides means by which the damper may be moved into fully or partly opened or closed position.

In practice, the fuel, which consists preferably of hard wood, is placed in the fire compartment 3 and ignited. After the wood starts to burn freely, the meat is placed in the cooking compartment 6 upon the grid 2, and thereafter the doors 7 and damper 17 are closed to keep all smoke and heat in the oven. As the meat is cooked in the presence of smoke from the hard wood, it will be given the required flavor and basting thereof is unnecessary.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

A barbecue oven comprising a casing, a grid arranged within the casing centrally between the top and bottom sides thereof and extending from the front to the rear side and from one lateral side to the other of the casing, the front side of the casing being provided above and below the grid with openings and the rear side of the casing being provided above the grid with a smoke outlet, a vertically arranged pintle rod positioned centrally of the front side of the casing and having angular upper and lower ends secured to the top and bottom sides of the casing, brackets secured to the front side of the casing and having apertures through which the pintle rod passes, doors for said openings and mounted upon the pintle rod and supported thereon by the brackets, and a damper for the smoke outlet.

In testimony whereof I affix my signature.

MARVIN S. LARCHE.